(12) United States Patent
Kim

(10) Patent No.: US 7,586,980 B2
(45) Date of Patent: Sep. 8, 2009

(54) APPARATUS FOR COHERENT COMBINING TYPE DEMODULATION IN COMMUNICATION SYSTEM AND METHOD THEREOF

(75) Inventor: Jong Heon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1042 days.

(21) Appl. No.: 10/771,338

(22) Filed: Feb. 5, 2004

(65) Prior Publication Data

US 2004/0156454 A1    Aug. 12, 2004

(30) Foreign Application Priority Data

Feb. 7, 2003    (KR)  ............... 10-2003-0007824

(51) Int. Cl.
*H04B 1/69*    (2006.01)
*H04B 7/216*    (2006.01)
(52) U.S. Cl. .................... 375/148; 375/342
(58) Field of Classification Search ............ 375/148, 375/130, 147, 149, 141, 347, 349; 455/101, 455/132, 131; 370/342, 335, 320, 441
See application file for complete search history.

(56) References Cited

U.S. PATENT DOCUMENTS 6,018,546 A * 1/2000 Rege .................. 375/148
2003/0012261 A1 * 1/2003 Toda .................. 375/147
2003/0138030 A1 * 7/2003 Gavnoudias et al. ........ 375/141
2003/0142726 A1 * 7/2003 Eltawil et al. ............. 375/146

FOREIGN PATENT DOCUMENTS

JP    2002-043980    2/2002

OTHER PUBLICATIONS

Korean Office Action dated Apr. 30, 3005.

* cited by examiner

*Primary Examiner*—Khai Tran
(74) *Attorney, Agent, or Firm*—KED & Associates, LLP

(57) ABSTRACT

Disclosed is an apparatus for coherent combining type demodulation and method thereof, in which a multi-path reception signal is demodulated by a coherent combining method in case that a transmitted signal, which was spread and modulated by such an orthogonal code as Walsh code, is received via multi-paths in the course of transmission and by which loss is more reduced than that of modulation of a non-coherent combining method. The modulation according to the coherent combining method needs a pilot signal. Yet, there exists no pilot signal on a reverse link of IS-95A. Hence, the present invention basically generates a phase reference signal or a decision directed pilot signal instead of the pilot signal to perform coherent combining using the phase reference signal or the decision directed phase signal.

12 Claims, 5 Drawing Sheets

APPARATUS FOR COHERENT COMBINING TYPE DEMODULATION IN COMMUNICATION SYSTEM AND METHOD THEREOF

This application claims the benefit of the Korean Application No. P2003-0007824 filed on Feb. 7, 2003, which is hereby incorporated by reference.

BACKGROUND OF THE INVENTION

1. Field of the Invention

The present invention relates to a coherent combining type demodulator in a communication system and method thereof, and more particularly, to an apparatus for coherent combining type demodulator and method thereof, by which signals received by a receiver are demodulated wherein the signals were spectrum-spread by orthogonal code to be transmitted from a transmitter via multi-paths.

2. Discussion of the Related Art

FIG. 1 is a block diagram of a transmitter by IS-95A standards used for CDMA (code division multiple access) communication system.

Referring to FIG. 1, a transmitter consists of an encoder 10, an orthogonal modulator 20, a spreader 30, base band filters 40a and 40b, mixers 50a and 50b, and an adder 60.

The encoder 10 encodes inputted information bits according to a predetermined coding type. The orthogonal modulator 20 modulates the encoded bits based on the orthogonal quadrature modulation method. The spreader 30 spreads the orthogonal-modulated signals by PN codes of in-phase component (hereinafter abbreviated 'I component') and PN codes of quadrature component (hereinafter abbreviated 'Q component') to output spread signals of I and Q components, respectively. The base band filters 40a and 40b perform waveform shaping to the spread signals of I and Q components. The mixers 50a and 50b apply carrier frequencies to the outputs of the I and Q components from the base band filters 40a and 40b to modulate, respectively. And, the adder 60 adds outputs of the mixers 50a and 50b to each other to output a signal s(t).

A signal transmitted from a transmitter is affected by fading due to multi-paths during transmission, whereby a receiver receives a combined signal of symbols transmitted along different paths. In order to demodulate such a combined signal according to the multi-paths efficiently, CDMA communication system adopts a rake receiver.

Generally, a rake receiver includes a multitude of fingers to demodulate a combined signal according to multi-paths.

FIG. 2 is a block diagram of a rake receiver including a plurality of fingers 1a to 1n according to a related art, and FIG. 3 is a detailed block diagram of one of the fingers in FIG. 2.

An operation of the related art receiver is explained by referring to FIG. 2 and FIG. 3 as follows.

An orthogonal quadrature despreader (hereinafter abbreviated 'despreader') 19, as shown in FIG. 3, despreads reception signals by applying PN codes of I and Q components to the reception signals rx_i and rx_q of the I and Q components, respectively. First and second Hadamard transformers 15a and 15b find Walsh correlation values for 64 Walsh codes, e.g., Hadamard codes, for I and Q components from the signals despread by the despreader 19, respectively. An energy detector 16 accumulates the Walsh correlation values of the I and Q components for the 64 Walsh codes, respectively, and adds the I and Q components of the accumulated Walsh correlation values to output 64 Walsh energy values.

Referring to FIG. 2, an adder 4 of a combiner 2 performs maximum-ratio combination on the corresponding energy values for the 64 Walsh codes of the fingers 1a to 1n to generate 64 outputs, and a dual maxima 5 finally outputs six symbols for the 64 Walsh codes (one Walsh code set). A decoder 3 decodes the outputs of the combiner 2 to output information bits. In the above-explained method, the combiner 2 adds the energy of each of the fingers 1a to 1n. So, it is called a rake receiver according to a non-coherent combining method.

Performance of a method of demodulating and decoding reception signals based on the above-mentioned non-coherent combining method is degraded by the loss generated from a non-coherent combining process, thereby being inferior to that of a method of demodulating and decoding reception signals based on the coherent combining method. For instance, when output signals of two fingers having the same S/N are combined, the coherent combining method enables to provide a combining gain of 3 dB in general. Yet, the non-coherent combining method has a non-coherent combining loss of about 1 dB, thereby providing a combining gain of 2 dB.

SUMMARY OF THE INVENTION

Accordingly, the present invention is directed to an apparatus for coherent combining type demodulation and method thereof that substantially obviates one or more problems due to limitations and disadvantages of the related art.

An object of the present invention is to provide an apparatus for coherent combining type demodulator and method thereof, in which a multi-path reception signal is demodulated by a coherent combining method in case that a transmitted signal, which was spread and modulated by such an orthogonal code as Walsh code, is received via multi-paths in the course of transmission.

The modulation according to the coherent combining method needs a pilot signal. Yet, there exists no pilot signal on a reverse link of IS-95A. Hence, the present invention basically generates a phase reference signal or a decision directed pilot signal instead of the pilot signal to perform coherent combining using the phase reference signal or the decision directed pilot signal. Hereby, the phase reference signal can be called a virtual pilot signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for coherent combining type demodulation in a communication system using orthogonal modulation includes means for generating a phase reference signal from signals received via multi-paths, means for detecting phase error values of the signals received via the multi-paths using the phase reference signal, respectively and means for compensating the received signals via the multi-paths by applying the detected phase error values thereto, respectively.

In another aspect of the present invention, a receiver using orthogonal modulation in a communication system includes an index detector generating Walsh index by calculating an energy of each Walsh code correlation value of signals received via multi-paths, and a plurality of fingers receiving the Walsh index generated from the index detector and compensating phase errors of the signals received via the multi-paths, respectively.

In another aspect of the present invention, a coherent combining type demodulation method using orthogonal demodulation in a mobile communication system includes the steps of generating a phase reference signal using signals received via multi-paths, and compensating a phase error of each of the signals received via the multi-paths using the phase reference signal to demodulate the corresponding received signal.

In another aspect of the present invention, a coherent combining type demodulation method using orthogonal demodulation in a mobile communication system includes the steps of receiving signals via multi-paths and dispreading the received signals for the corresponding multi-paths, respectively, finding Walsh correlation values of the despread signals, finding symbol energy values of the Walsh correlation values and detecting Walsh index having a maximum symbol energy among the symbol energy values, estimating phase error values of the Walsh correlation values by generating the Walsh correlation value corresponding to the Walsh index as a phase reference signal, delaying the despread signals until the corresponding phase error value is outputted, compensating phase errors of the despread signals by applying the estimated phase error values to the delayed despread signals, respectively, and finding the Walsh correlation values of the phase-compensated despread signals.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
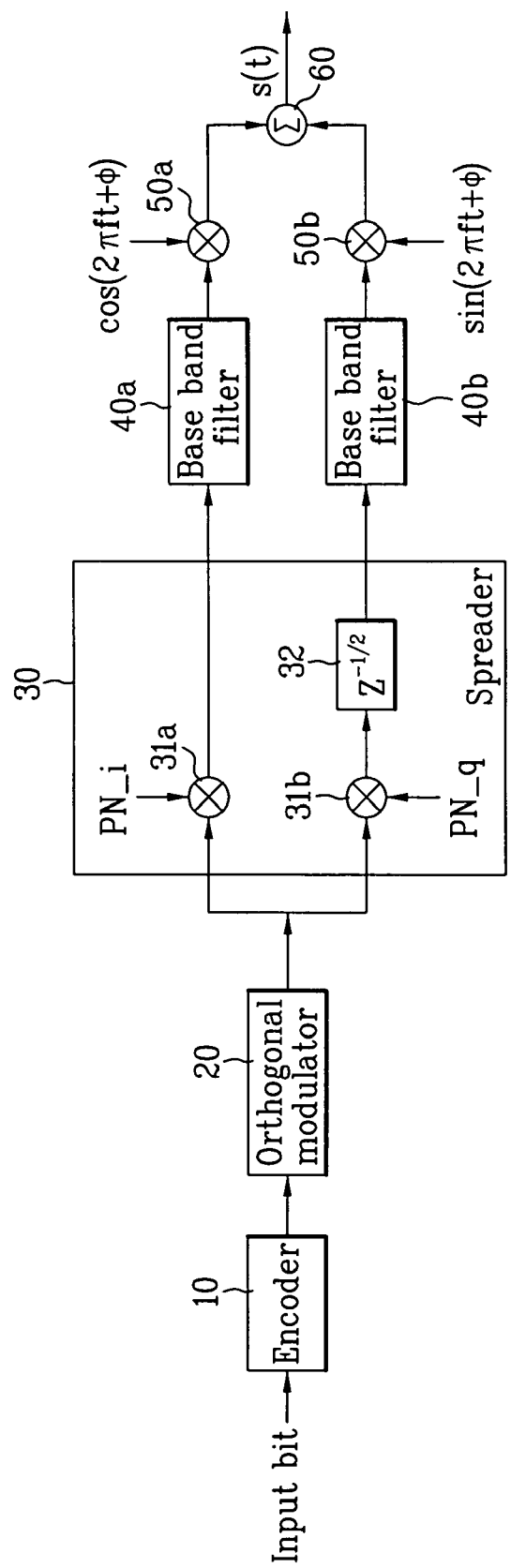
FIG. 1 is an exemplary block diagram of a transmitter by IS-95A standards.
Figure 2:
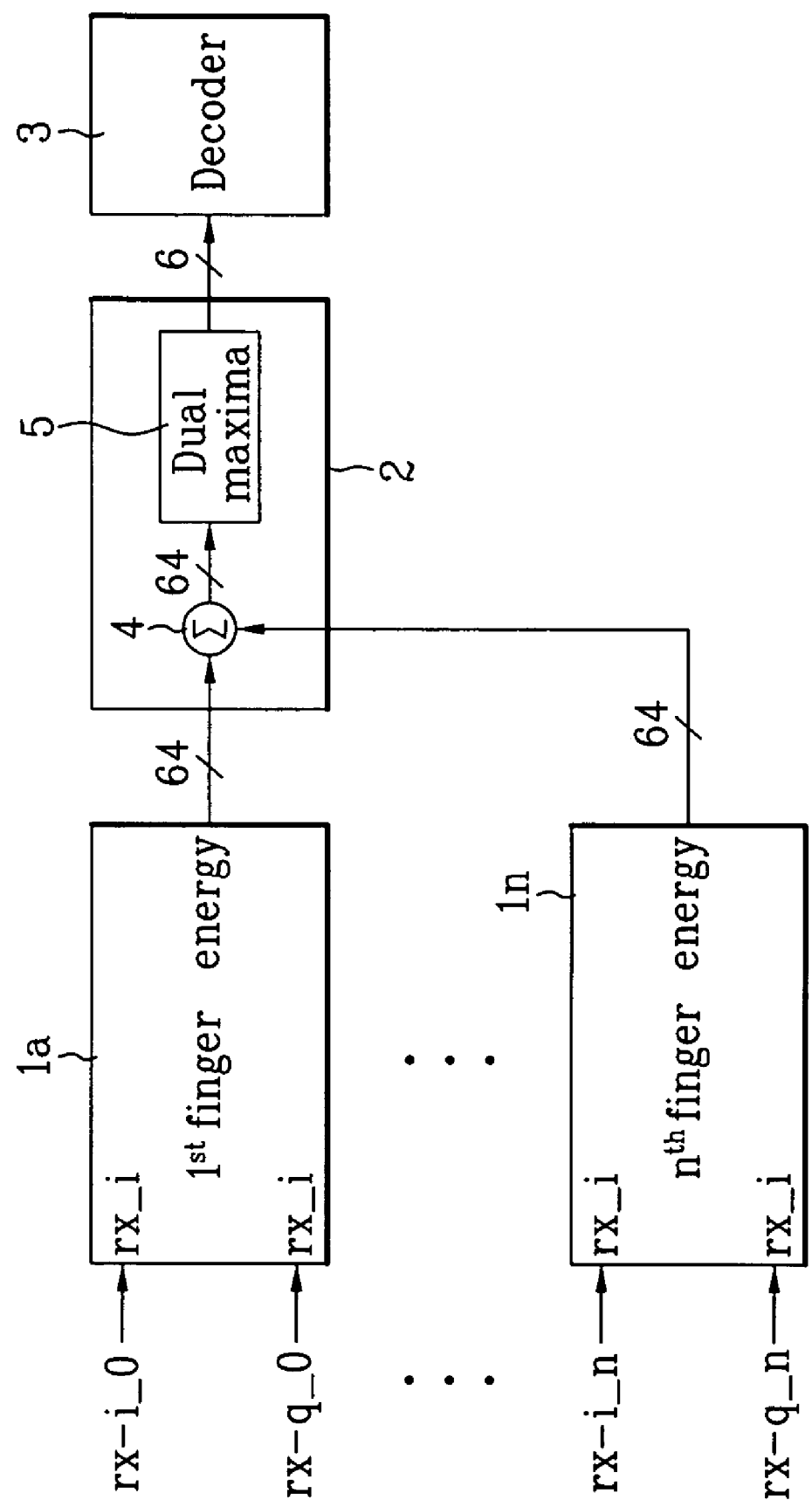
FIG. 2 is an exemplary block diagram of a rake receiver including a plurality of fingers 1a to 1n according to a related art.
Figure 3:
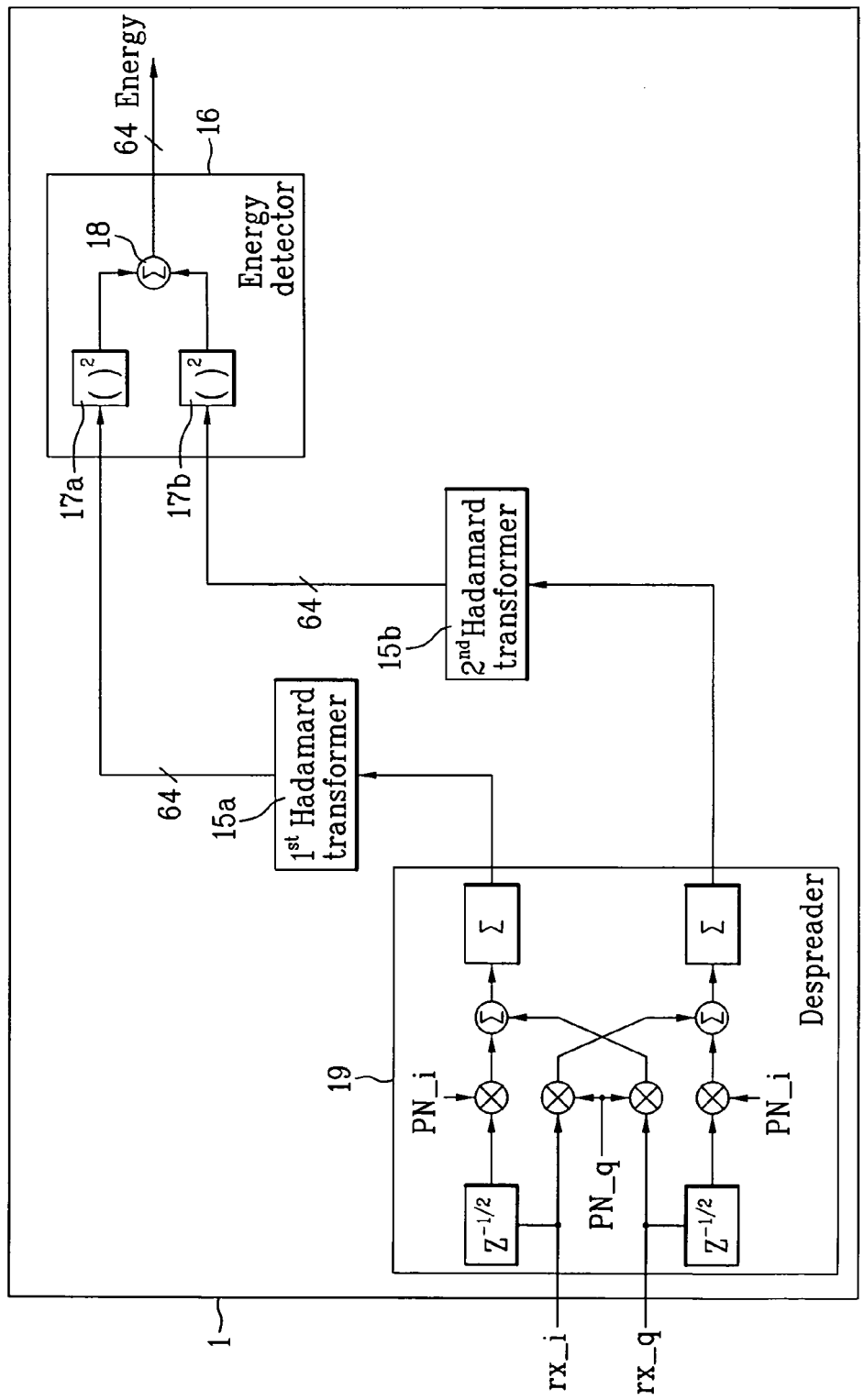
FIG. 3 is a detailed block diagram of one of the fingers in FIG. 2.
Figure 4:
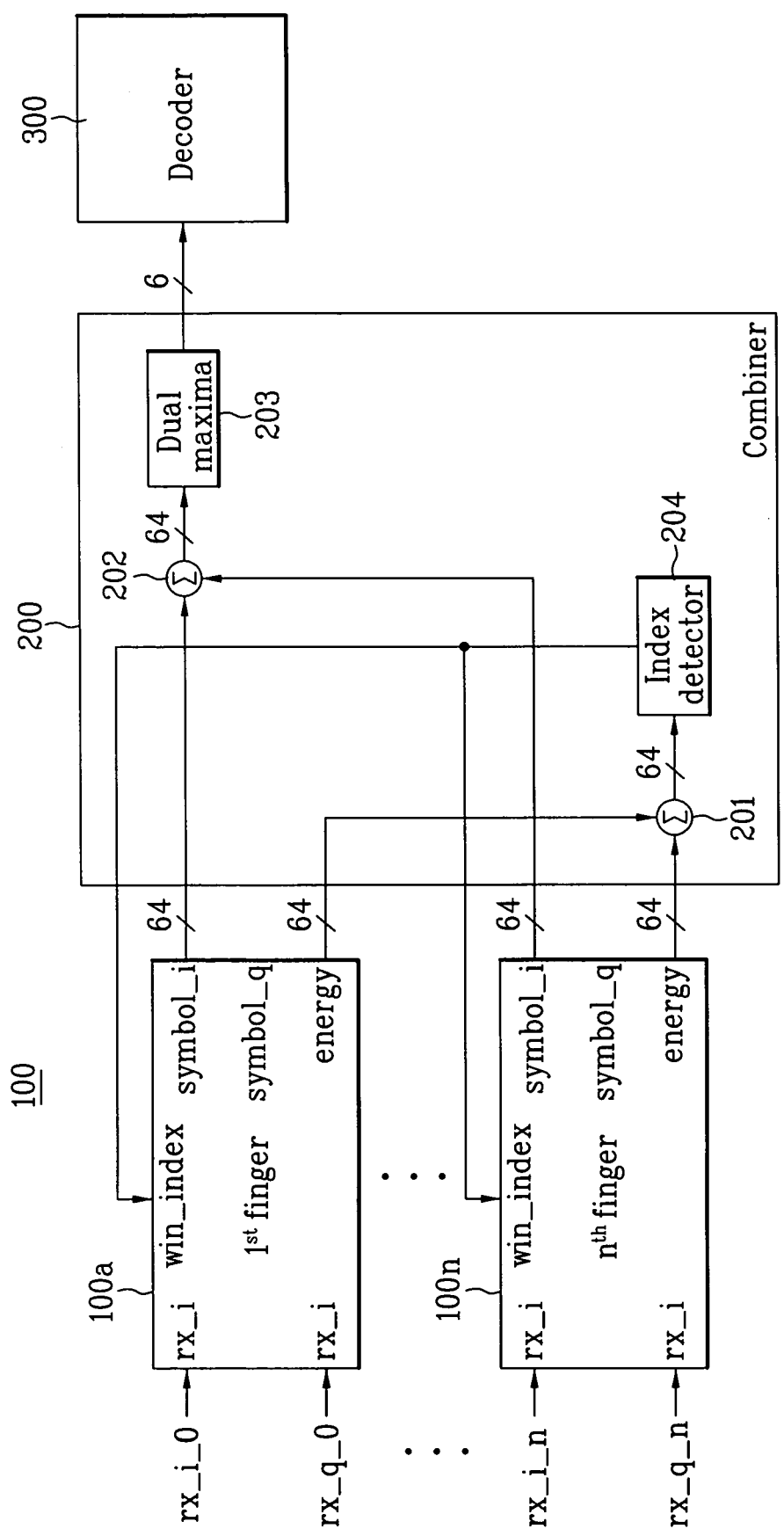
FIG. 4 is a block diagram of a demodulation apparatus according to a preferred embodiment of the present invention.
Figure 5:
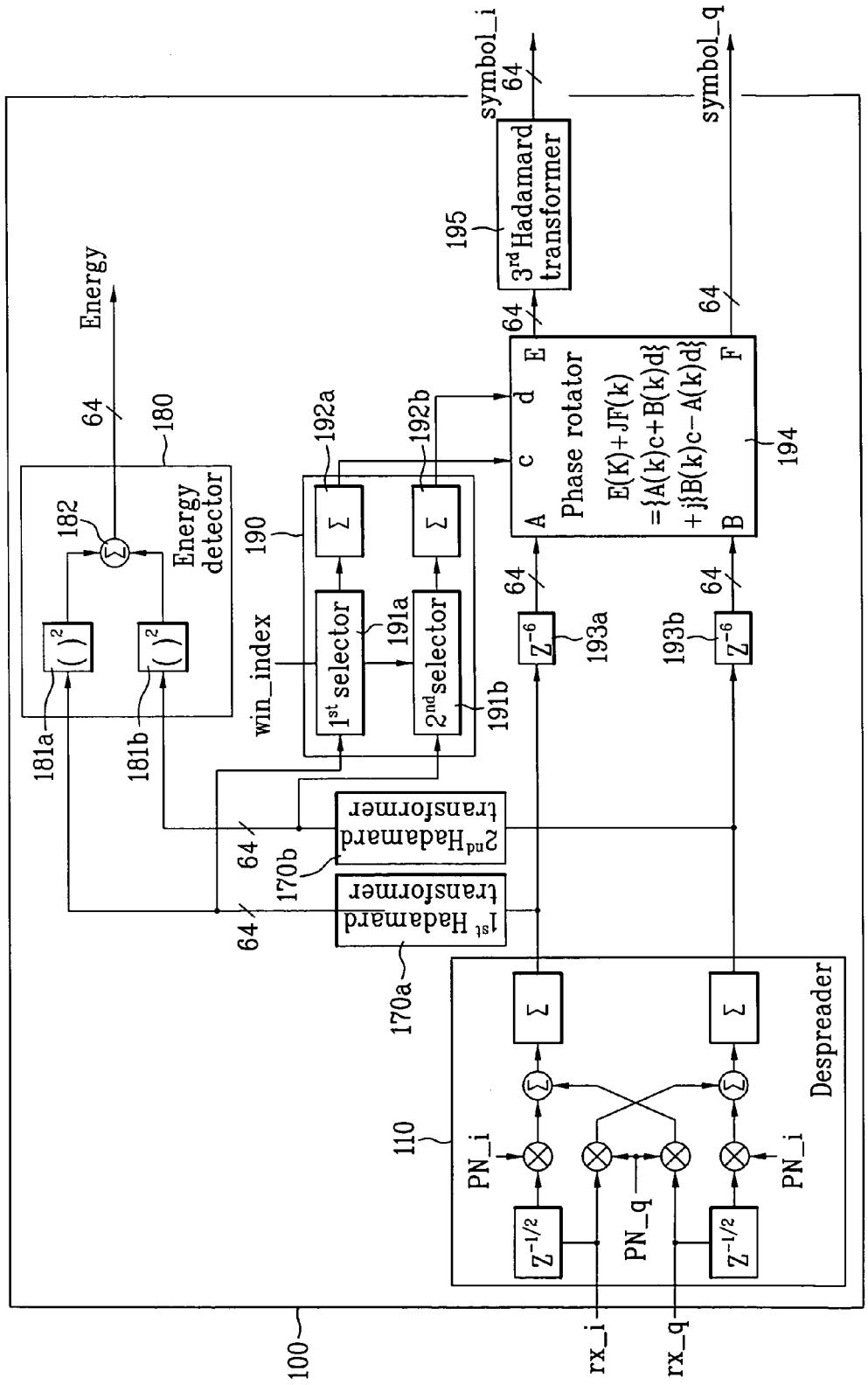
FIG. 5 is a detailed block diagram of a finger in FIG. 4.

FIG. 4 is a block diagram of a receiver according to a preferred embodiment of the present invention and FIG. 5 is a detailed block diagram of a finger in FIG. 4.

Referring to FIG. 4, the receiver according to the present invention includes a plurality of fingers 100a~100n, a combiner 200, and a decoder 300. A plurality of the fingers 100a to 100n receive signals via multi-paths, respectively and receive a phase reference signal generated from the combiner 200 to compensate phase errors of the received signals to output. The combiner 200 includes a vector adder 201 adding Walsh energy values from the respective fingers 100a~100n, an index detector 204 detecting an index (win_index) of Walsh code corresponding to maximum Walsh (or symbol) energy among output values of the vector adder 201 and providing the detected index to each of the fingers 100a to 100n, an adder 202 adding all correlation values of I component outputted from the respective fingers 100a~100n, and a dual maxima 203 determining a data symbol value that is an output of the adder 202. And, the decoder 300 decodes an output of the combiner 200 to output data symbols.

Referring to FIG. 5, each of the fingers 100 includes an orthogonal quadrature despreader (hereinafter abbreviated 'despreader') 110, first and second Hadamard transformers 170a and 170b, an energy detector 180, a phase estimator (e.g., decision directed pilot estimator) 190, delayers 193a and 193b, a phase rotator 194, and a third Hadamard transformer 195.

The despreader 110 applies PN codes of I and Q components to reception signals rx_i and rx_q of I and Q components, respectively to despread the reception signals. The construction of the despreader 110 is known in public, whereby details of the despreader 110 are skipped in the following description. The I and Q components of the signal despread by the despreader 110 are transformed by the first and second Hadamard transformers 170a and 170b to find Walsh correlation values for 64 Walsh codes, e.g., Hadamard codes, for the I and Q components, respectively. And, the energy detector 180 outputs Walsh energy values of the Walsh correlation values for the 64 Walsh codes of the I and Q components.

The Walsh energy values outputted from the energy detectors 180 of the respective fingers 100a to 100n are added per each Walsh code by the vector adder 201 of the combiner 200 to be inputted to the index detector 204. The index detector 204 detects index (win_index) of the Walsh code corresponding to the maximum Walsh or symbol energy among output values of the vector 201 to use as a phase reference signal and transfers the detected index to the phase estimator 190 of each of the fingers 100a to 100n.

The phase estimator (e.g., decision directed pilot estimator) 190 estimates phase error values of the corresponding data symbols from the Walsh correlation values of the I and Q components corresponding to the index (win_index) of the Walsh code among the 64 I and Q component Walsh correlation values of the first and second Hadamard transformers 170a and 170b. Namely, first and second selectors 191a and 191b select values corresponding to the index (win_index) of the Walsh code among the Walsh correlation values of the I and Q components that are outputs of the first and second Hadamard transformers 170a and 170b, respectively. The first and second phase estimation filters 192a and 192b then perform phase estimation filtering to estimate phase error values to output, respectively. The embodiment of the present invention adopts a method of performing accumulation on six values corresponding to one PCG (power control group) by implementing the phase estimation filter by a form of an accumulator. Yet, the phase estimation filtering method is not limited to such a method.

The delayers 193a and 193b delay the despread signals of the I and Q components until the phase error values are outputted from the phase estimator 190, respectively. The phase rotator 194 performs complex conjugate multiplication of the despread signals of the I and Q components, which are respectively delayed by the delayers 193a and 193b, and the estimated phase error values, respectively to compensate for phase errors of the despread signals of the I and Q components. Thus, the phase rotator 194 outputs the corresponding results. And, the third Hadamard transformer 195 finds Walsh correlation values for the 64 Walsh codes, e.g., Hadamard codes, from the despread signal of the I component outputted from the phase rotator 194.

The 64 I-component Walsh correlation values outputted from the third Hadamard transformer 195 of each of the fingers 100a to 100n are coherent-combined by the vector adder 201 of the combiner 200, and a combined value is found. The combined value is transferred to the dual maxima 203. The dual maxima 203 then detects six symbols per one Walsh code set (64 Walsh codes) finally, which are decoded by the decoder 300 to output the original information bits.

In the embodiment of the present invention, the despreading method can be modified according to the spreading method of the transmitter as well as the Hadamard transformation can be modified into another method of finding correlations.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for coherent combining type demodulation in a communication system using orthogonal modulation, the apparatus comprising:
    means for generating a phase reference signal from signals received via multi-paths;
    means for detecting phase error values of the signals received via the multi-paths using the phase reference signal, respectively; and
    means for compensating the received signals via the multi-paths by applying the detected phase error values thereto, respectively,
    wherein the means for generating the phase reference signal comprises:
        means for calculating correlation values of orthogonal codes of the received signals via the multi-paths, respectively, and for calculating symbol energy values of the correlation values; and
        means for adding the symbol energy values of the correlation values per each orthogonal code for the entire multi-paths to determine the orthogonal code having a maximum energy value as the phase reference signal.

2. The apparatus of claim 1, further comprising means for delaying the received signals while the phase error values detecting means detects the phase error values.

3. The apparatus of claim 1, wherein the phase error values detecting means comprises:
    means for selecting a value corresponding to the phase reference signal among the orthogonal code correlation values of the received signals via the multi-paths; and
    means for performing phase estimation filtering on the selected value.

4. The apparatus of claim 3, wherein the phase estimation filtering means comprises an accumulator.

5. The apparatus of claim 1, wherein the means for compensating the received signals compensates the phase errors by conjugate-complex-multiplying the received signals by the detected phase error values.

6. The apparatus of claim 1, further comprising:
    an adder adding in-phase components of the correlation values outputted from the means for compensating the received signals; and
    means for determining a symbol value of each value outputted from the adder.

7. The apparatus of claim 1, wherein each orthogonal code is a Walsh code.

8. A receiver in a communication system using orthogonal modulation, comprising:
    a plurality of fingers; and
    an index detector for detecting a Walsh index indicating a maximum Walsh code based on energy values of Walsh code correlation values of signals received via multi-paths,
    wherein each of the energy values are provided by each of the plurality of fingers, and the plurality of fingers are capable of receiving the Walsh index generated from the index detector and are capable of compensating the signals received via the multi-paths, respectively.

9. The receiver of claim 8, wherein each of the fingers comprises:
    a despreader for despreading I and Q-component signals received via the corresponding multi-paths;
    a first transformer and a second transformer for finding Walsh correlation values of the despread I and Q-component signals;
    an energy detector for finding symbol energy values of the Walsh correlation values to output to the index detector;
    a phase estimator for estimating phase error values of the Walsh correlation values by generating the Walsh correlation value corresponding to the Walsh index as a phase reference signal;
    a first delayer and a second delayer for delaying the despread I and Q-component signals until the corresponding phase error value is outputted from the phase estimator;
    a phase rotator for compensating phase errors of the despread signals by applying the estimated phase error values to the despread signals delayed by the first delayer and the second delayer; and
    a third transformer for finding the Walsh correlation values of the phase-compensated despread I-component signals.

10. The receiver of claim 9, wherein the phase estimator compensates the corresponding phase error by conjugate-complex-multiplying the corresponding despread signal by the corresponding detected phase error value.

11. The receiver of claim 9, further comprising:
    an adder adding output values of the third transformer to output; and
    a decider determining a symbol value corresponding to the I-component Walsh correlation value outputted from the adder.

12. A receiver using a coherent combining technique in a communication system using orthogonal modulation, comprising:
    a plurality of fingers for despreading received signals and outputting first outputs corresponding to Walsh code energy values calculated by using a correlation value of each walsh code and the despread signals and second outputs by compensating the correlation value by performing phase estimation filtering for the correlation value according to a control signal; and
    a combiner for outputting the control signal indicating the walsh code having a maximum energy value of the first outputs to each fingers and a symbol for a walsh code set by combining the second outputs.

* * * * *